(12) United States Patent
Brown et al.

(10) Patent No.: US 9,621,352 B2
(45) Date of Patent: *Apr. 11, 2017

(54) SYSTEM AND METHOD FOR VERIFYING DIGITAL SIGNATURES ON CERTIFICATES

(71) Applicant: BLACKBERRY LIMITED, Waterloo (CA)

(72) Inventors: Michael K. Brown, Waterloo (CA); Michael S. Brown, Waterloo (CA)

(73) Assignee: BLACKBERRY LIMITED, Waterloo, Ontario (CA)

(*) Notice: Subject to any disclaimer, the term of this patent is extended or adjusted under 35 U.S.C. 154(b) by 154 days.

This patent is subject to a terminal disclaimer.

(21) Appl. No.: 14/250,493

(22) Filed: Apr. 11, 2014

(65) Prior Publication Data
US 2014/0223186 A1 Aug. 7, 2014

Related U.S. Application Data

(63) Continuation of application No. 12/771,194, filed on Apr. 30, 2010, now Pat. No. 8,725,643, which is a
(Continued)

(51) Int. Cl.
*G06F 21/00* (2013.01)
*H04L 9/32* (2006.01)
(Continued)

(52) U.S. Cl.
CPC ....... *H04L 9/3247* (2013.01); *G06Q 20/0855* (2013.01); *G06Q 20/367* (2013.01);
(Continued)

(58) Field of Classification Search
CPC ... G06F 21/00; G06Q 20/382; G06Q 20/3674
(Continued)

(56) References Cited

U.S. PATENT DOCUMENTS 4,615,002 A 9/1986 Innes
6,189,098 B1 2/2001 Kaliski, Jr.
(Continued)

FOREIGN PATENT DOCUMENTS

AU 2005225093 9/2008
CA WO 2005015867 A1 * 2/2005 ......... G06Q 20/3821
(Continued)

OTHER PUBLICATIONS

Document relating to AU Application No. 2005225093, dated Dec. 13, 2006 (Examination Report).
(Continued)

*Primary Examiner* — James A Reagan
(74) *Attorney, Agent, or Firm* — Integral Intellectual Property Inc.; Miriam Paton; Amy Scouten

(57) ABSTRACT

A system and method for verifying a digital signature on a certificate, which may be used in the processing of encoded messages. In one embodiment, when a digital signature is successfully verified in a signature verification operation, the public key used to verify that digital signature is cached. When a subsequent attempt to verify the digital signature is made, the public key to be used to verify the digital signature is compared to the cached key. If the keys match, the digital signature can be successfully verified without requiring that a signature verification operation in which some data is decoded using the public key be performed.

20 Claims, 10 Drawing Sheets

Related U.S. Application Data continuation of application No. 10/975,988, filed on Oct. 29, 2004, now Pat. No. 7,716,139.

(51) Int. Cl.
  *G06Q 20/08* (2012.01)
  *G06Q 20/36* (2012.01)
  *G06Q 20/38* (2012.01)
  *G06Q 20/40* (2012.01)
  *H04L 29/06* (2006.01)
  *H04L 9/08* (2006.01)

(52) U.S. Cl.
  CPC ..... *G06Q 20/3674* (2013.01); *G06Q 20/3821* (2013.01); *G06Q 20/401* (2013.01); *H04L 9/0894* (2013.01); *H04L 9/3263* (2013.01); *H04L 63/0823* (2013.01); *H04L 2209/38* (2013.01); *H04L 2209/80* (2013.01)

(58) Field of Classification Search
  USPC .......................................................... 705/50
  See application file for complete search history.

(56) References Cited

U.S. PATENT DOCUMENTS

| | | | |
|---|---|---|---|
| 6,212,553 B1 | 4/2001 | Lee et al. | |
| 6,434,601 B1 | 8/2002 | Rollins | |
| 6,760,752 B1 | 7/2004 | Liu et al. | |
| 6,807,277 B1 | 10/2004 | Doonan et al. | |
| 6,834,277 B1 | 12/2004 | Learmonth | |
| 6,990,578 B1 | 1/2006 | O'Brien et al. | |
| 7,082,536 B2 | 7/2006 | Filipi-Martin et al. | |
| 7,299,412 B1 | 11/2007 | Hull et al. | |
| 7,716,139 B2 * | 5/2010 | Brown ............... | G06Q 20/0855 705/65 |
| 8,725,643 B2 | 5/2014 | Brown et al. | |
| 2001/0014156 A1 | 8/2001 | Murakami | |
| 2002/0025046 A1 | 2/2002 | Lin | |
| 2002/0026574 A1 | 2/2002 | Watanabe et al. | |
| 2002/0087479 A1 * | 7/2002 | Malcolm ............... | G06F 21/606 705/64 |
| 2003/0105589 A1 | 6/2003 | Liu et al. | |
| 2003/0147536 A1 | 8/2003 | Andivahis et al. | |
| 2003/0204741 A1 | 10/2003 | Schoen et al. | |
| 2004/0133775 A1 | 7/2004 | Callas et al. | |
| 2004/0139163 A1 | 7/2004 | Adams et al. | |
| 2004/0148356 A1 | 7/2004 | Bishop et al. | |
| 2004/0249817 A1 | 12/2004 | Liu et al. | |
| 2005/0038991 A1 | 2/2005 | Brown et al. | |
| 2005/0055552 A1 * | 3/2005 | Shigeeda ............ | H04L 63/0442 713/171 |
| 2005/0071631 A1 | 3/2005 | Langer | |
| 2005/0071636 A1 * | 3/2005 | Lee ......................... | H04L 63/06 713/170 |
| 2005/0086477 A1 | 4/2005 | Lin et al. | |
| 2005/0138388 A1 | 6/2005 | Pagnetti et al. | |
| 2006/0031309 A1 | 2/2006 | Luoffo et al. | |
| 2006/0031315 A1 | 2/2006 | Fenton et al. | |
| 2006/0168012 A1 | 7/2006 | Rose et al. | |
| 2007/0005706 A1 | 1/2007 | Branda et al. | |
| 2007/0038704 A1 | 2/2007 | Brown et al. | |
| 2007/0113101 A1 | 5/2007 | LaVasseur et al. | |
| 2007/0260876 A1 | 11/2007 | Brown et al. | |
| 2008/0294726 A1 | 11/2008 | Sidman | |

FOREIGN PATENT DOCUMENTS

| | | | |
|---|---|---|---|
| CA | 2526863 | 4/2006 | |
| CN | 1767438 | 5/2006 | |
| CN | 1691503 A1 * | 8/2006 | ............. H04L 9/302 |
| CN | 100536395 | 9/2009 | |
| EP | 1536601 | 6/2005 | |
| EP | 1653655 | 5/2006 | |
| HK | 1089589 | 10/2004 | |
| JP | 10-79025 | 5/1989 | |
| JP | 9-205424 | 8/1997 | |
| JP | 2000-10477 | 1/2000 | |
| JP | 2000-312204 | 11/2000 | |
| JP | 2002-189976 | 7/2002 | |
| JP | 2003-162508 | 6/2003 | |
| JP | 2004-015257 | 1/2004 | |
| JP | 2004-247799 | 9/2004 | |
| JP | 2006129490 | 5/2006 | |
| JP | 4491402 | 4/2010 | |
| SG | 122015 | 5/2008 | |
| TW | 505905 | 10/2002 | |
| TW | I324871 | 5/2010 | |
| WO | 99/08429 | 2/1999 | |
| WO | 02/21464 | 3/2002 | |
| WO | 02/37245 | 5/2002 | |
| WO | 03/063413 | 7/2003 | |
| WO | 2005015867 | 2/2005 | |
| WO | 2005107133 | 11/2005 | |

OTHER PUBLICATIONS

Document relating to AU Application No. 2005225093, dated Mar. 31, 2008 (Examination Report).
Document relating to AU Application No. 2005225093, dated Jan. 8, 2009 (Letters Patent).
Document relating to AU Application No. 2005225093, dated Sep. 11, 2008 (Notice of Acceptance).
Document relating to CA Application No. 2,526,863, dated Nov. 3, 2009 (Office Action).
Document relating to CA Application No. 2,526,863, dated Jun. 10, 2010 (Notice of Allowance).
Document relating to CN Application No. 200510118777.9, dated Feb. 20, 2009 (Office Action).
Document relating to CN Application No. 200510118777.9, dated Apr. 14, 2009 (Notification of Grant).
Document relating to CN Application No. 200510118777.9, dated Sep. 2, 2009 (Certificate of Invention).
Document relating to EP Application No. 04105424.8, dated Feb. 24, 2005 (Search and Exam Report).
Document relating to EP Application No. 04105424.8, dated Mar. 30, 2005 (Response).
Document relating to EP Application No. 04105424.8, dated Aug. 11, 2006 (Communication).
Document relating to EP Application No. 04105424.8, dated Nov. 3, 2006 (Decision to Grant).
Document relating to HK Application No. 06111497.9, dated Feb. 2, 2007 (Certificate of Grant).
Document relating to in Application No. 2805/DEL/2005, dated Sep. 14, 2012 (Examination Report).
Document relating to JP Application No. 2005-313157, dated May 7, 2009 (Office Action).
Document relating to JP Application No. 2005-313157, dated Jul. 7, 2009 (Office Action).
Document relating to JP Application No. 2005-313157, dated Mar. 9, 2010 (Notice of Allowance).
Document relating to KR Application No. 0740521, dated Jul. 11, 2007 (Letters Patent).
Document relating to KR Application No. 10-2005-0101996, dated Nov. 3, 2006 (Examination Report).
Document relating to KR Application No. 10-2005-0101996, dated Apr. 16, 2007 (Notice of Decision).
Document relating to SG Application No. 200506820-0, dated Feb. 23, 2006 (Written Opinion).
Document relating to SG Application No. 200506820-0, dated Jan. 12, 2007 (Examination Report).
Document relating to SG Application No. 200506820-0, dated May 30, 2008 (Certificate of Grant).
Document relating to TW Application No. 094137999, dated May 14, 2009 (Office Action).
Document relating to TW Application No. 094137999, dated Jan. 28, 2010 (Notice of Allowance).

(56) References Cited

OTHER PUBLICATIONS

Document relating to TW Application No. 094137999, dated May 11, 2010 (Letters Patent).
Document relating to U.S. Appl. No. 10/975,988, dated Dec. 22, 2009 (Prosecution History).
Document relating to U.S. Appl. No. 11/418,176, dated Nov. 30, 2009 (Prosecution History).
Document relating to U.S. Appl. No. 12/771,194, dated Apr. 30, 2010 (Prosecution History).
Installing Certificates with Upcerins, http://developer.openwave.com/htmldoc/41/tools/nottools5.html, Chapter 2, pp. 1-6.
Pugh, William et al., "Incremental Computation via Function Caching", Conference Record of the Sixteenth Annual ACM Symposium on Principles of Programming Languages ACM New York, NY, U.S.A., Jan. 11, 1989, pp. 315-328.
Requesting Certificates with CertMaker, http://developer.openwave.com/htmldoc/41/tools/nottools2.html, Chapter 2, pp. 1-4.
Stallings, W., "Cryptography & Network Security: Principles & Practice—2nd" 1998, pp. 163-205.
Walsh, Kevin et al., "Staged Simulation: A General Technique for Improving Simulation Scale and Performance", ACM Transactions on Modeling and Computer Simulation vol. 14, No. 2, Apr. 2004, pp. 170-195.
Webmail Basics, Academic Computing Support, May 2003, pp. 1-8.

\* cited by examiner

SYSTEM AND METHOD FOR VERIFYING DIGITAL SIGNATURES ON CERTIFICATES

CROSS REFERENCE TO RELATED APPLICATION

This application is a continuation of prior U.S. patent application Ser. No. 12/771,194, filed on Apr. 30, 2010, which is a continuation of U.S. patent application Ser. No. 10/975,988, filed on Oct. 29, 2004. U.S. patent application Ser. No. 10/975,988 issued to U.S. Pat. No. 7,716,139 on May 11, 2010. The entire contents of application Ser. No. 12/771,194 and of application Ser. No. 10/975,988 are hereby incorporated by reference.

FIELD OF THE INVENTION

The invention relates generally to the processing of messages, such as e-mail messages, and more specifically to a system and method for validating certificates used in the processing of encoded messages.

BACKGROUND OF THE INVENTION

Electronic mail ("e-mail") messages may be encoded using one of a number of known protocols. Some of these protocols, such as Secure Multiple Internet Mail Extensions ("S/MIME") for example, rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. The authenticity of public keys used in the encoding of messages is validated using certificates. In particular, if a user of a computing device wishes to encrypt a message before the message is sent to a particular individual, the user will require a certificate for that individual. That certificate will typically comprise the public key of the individual, as well as other identification-related information.

Certificates are digital documents that are typically issued by certification authorities. In order to trust a particular public key, the public key typically needs to be issued by a certification authority that is also trusted, or by an entity associated with the trusted certification authority. The relationship between a trusted certification authority and an issued public key can be represented by a series of related certificates, also referred to as a certificate chain. The certificate chain can be followed to determine the validity of a certificate.

Typically, a certification authority will digitally sign each certificate that it issues, to certify that a specific public key belongs to the purported owner as indicated on the respective certificate. In building certificate chains, the digital signatures on the certificates of the chain often need to be verified. Verification of a digital signature on a certificate is a process that requires the public key of the certification authority that issued the certificate.

SUMMARY OF THE INVENTION

The verification process can be time-consuming and costly (e.g. in terms of computing resource usage), particularly where the verifications are performed on smaller devices, such as mobile devices for example. Where multiple certificates are processed on a user's computing device, the same digital signature may be subject to verification more than once. Embodiments of the invention are generally directed to a system and method that facilitates more efficient verification of digital signatures on certificates by storing certain information employed in signature verification operations for reuse.

In a broad aspect of the invention, there is provided a method of verifying a digital signature on a certificate on a computing device, the method comprising the steps of: performing a first signature verification operation on the digital signature using a first public key associated with an issuer of the certificate; determining if the digital signature is successfully verified in the first signature verification operation; storing the first public key in a memory store; receiving a request to perform a second signature verification operation on the digital signature using a second public key associated with an issuer of the certificate; comparing the second public key with the first public key stored in the memory store to determine if the first and second public keys match; and indicating successful verification of the digital signature in response to the request if the digital signature was successfully verified in the first signature verification operation and if a match is determined at the comparing step, whereby the second signature verification operation need not be performed.

BRIEF DESCRIPTION OF THE DRAWINGS

For a better understanding of embodiments of the invention, and to show more clearly how it may be carried into effect, reference will now be made, by way of example, to the accompanying drawings in which.

DETAILED DESCRIPTION OF EMBODIMENTS OF THE INVENTION

Some embodiments of the invention make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
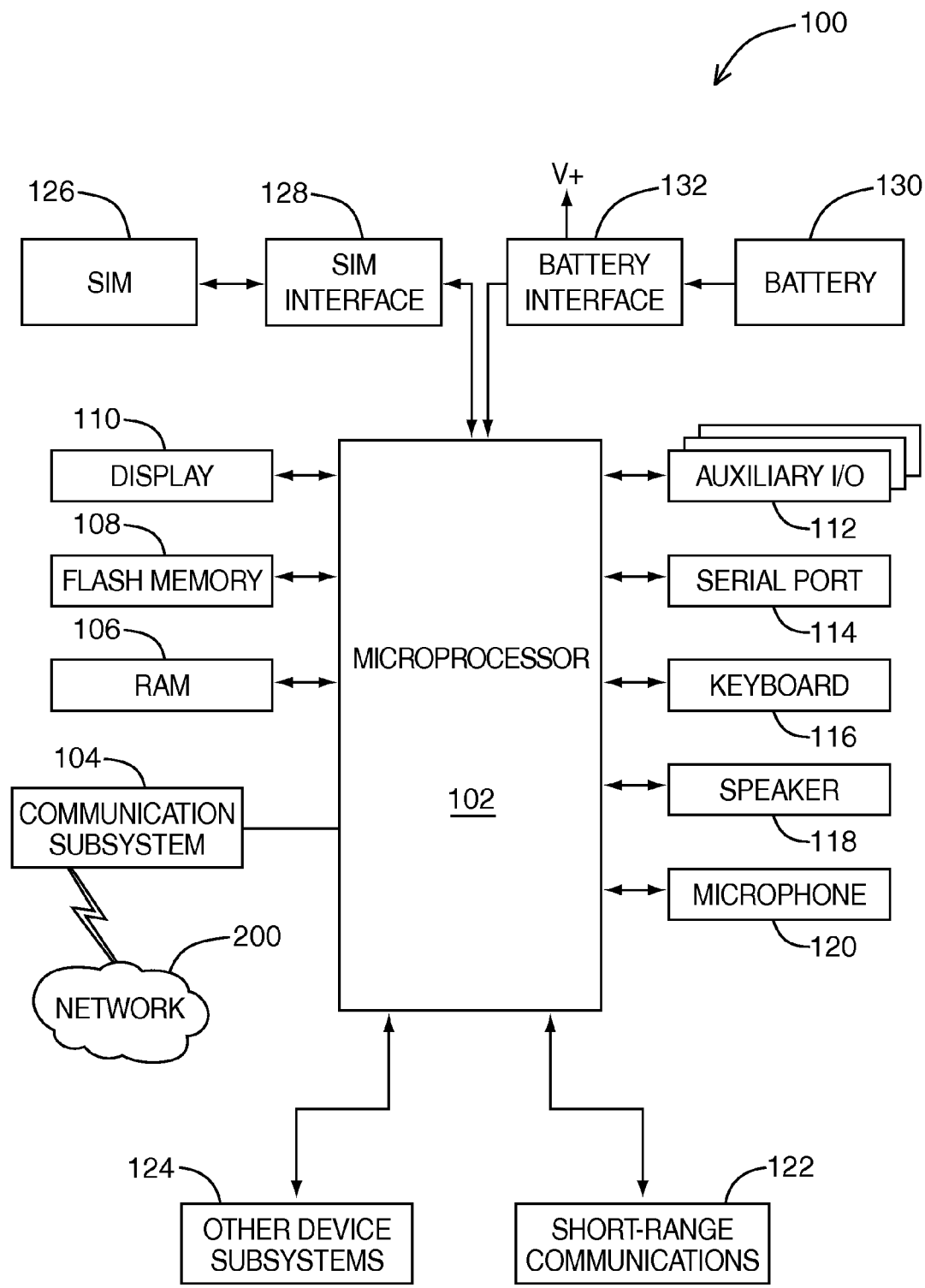
FIG. 1 is a block diagram of a mobile device in one example implementation.
Figure 2:
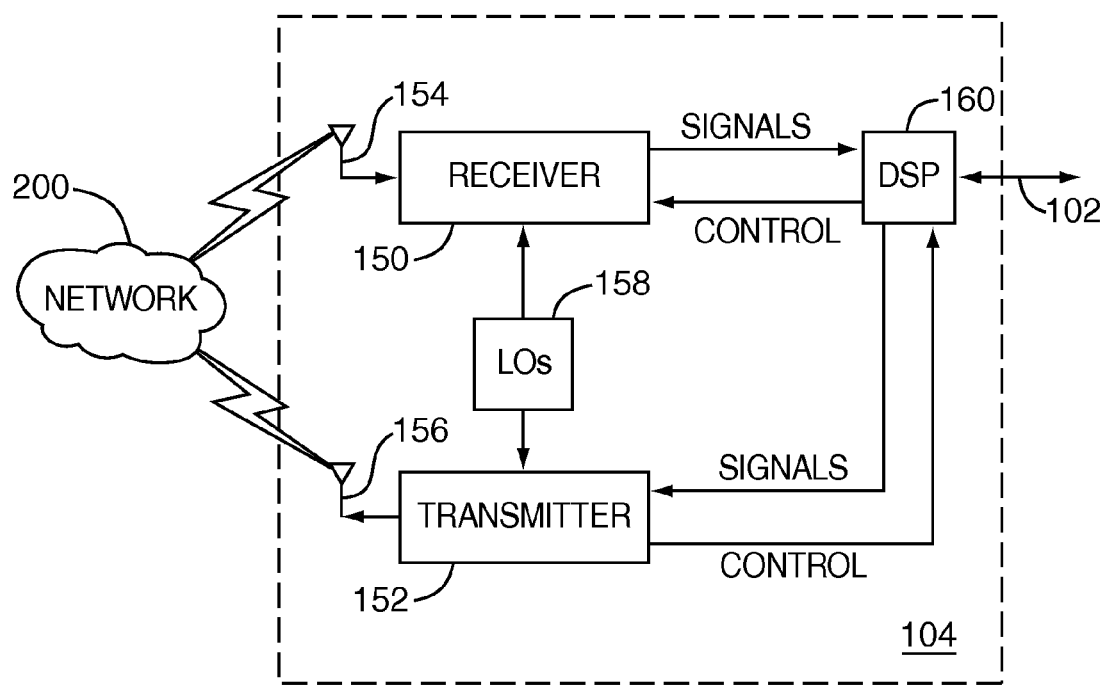
FIG. 2 is a block diagram of a communication subsystem component of the mobile device of FIG. 1.
Figure 3:
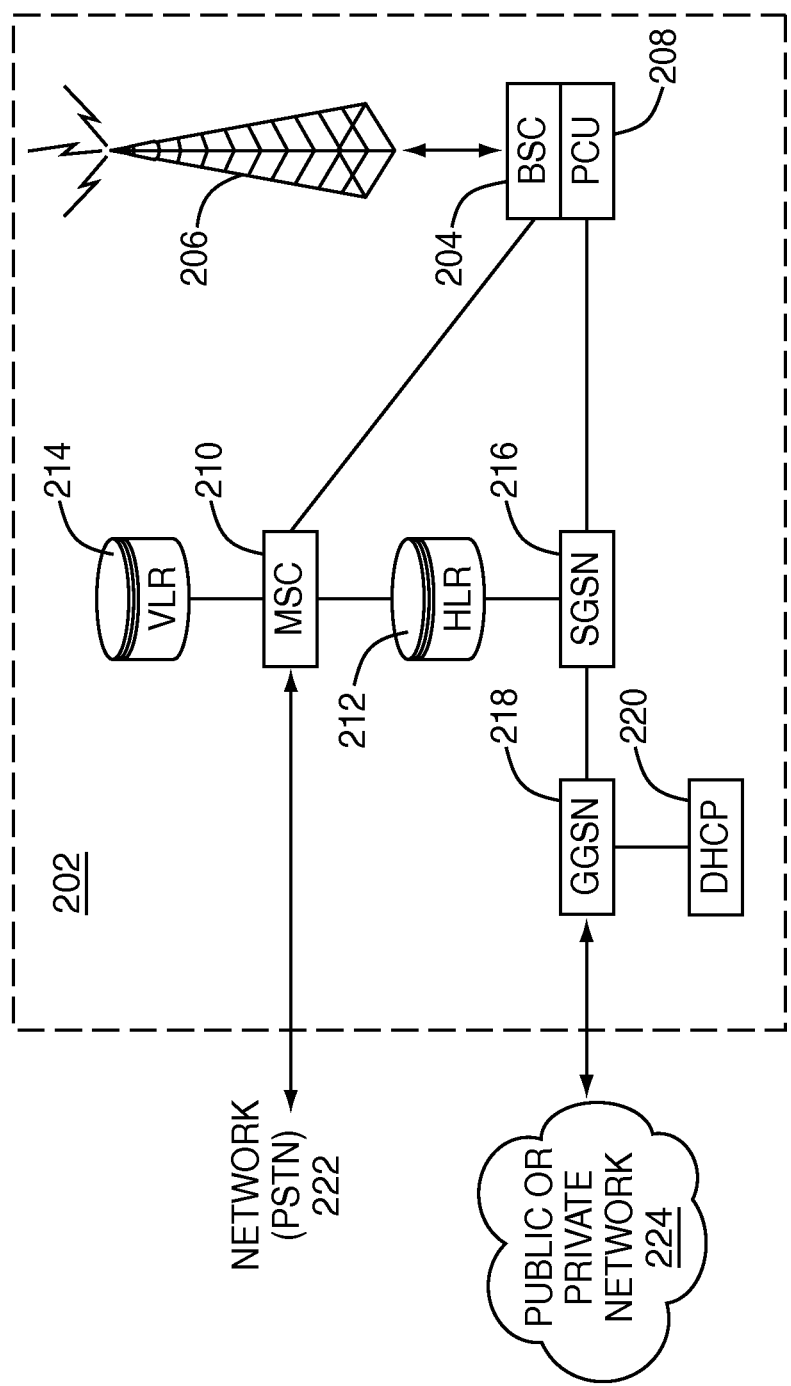
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
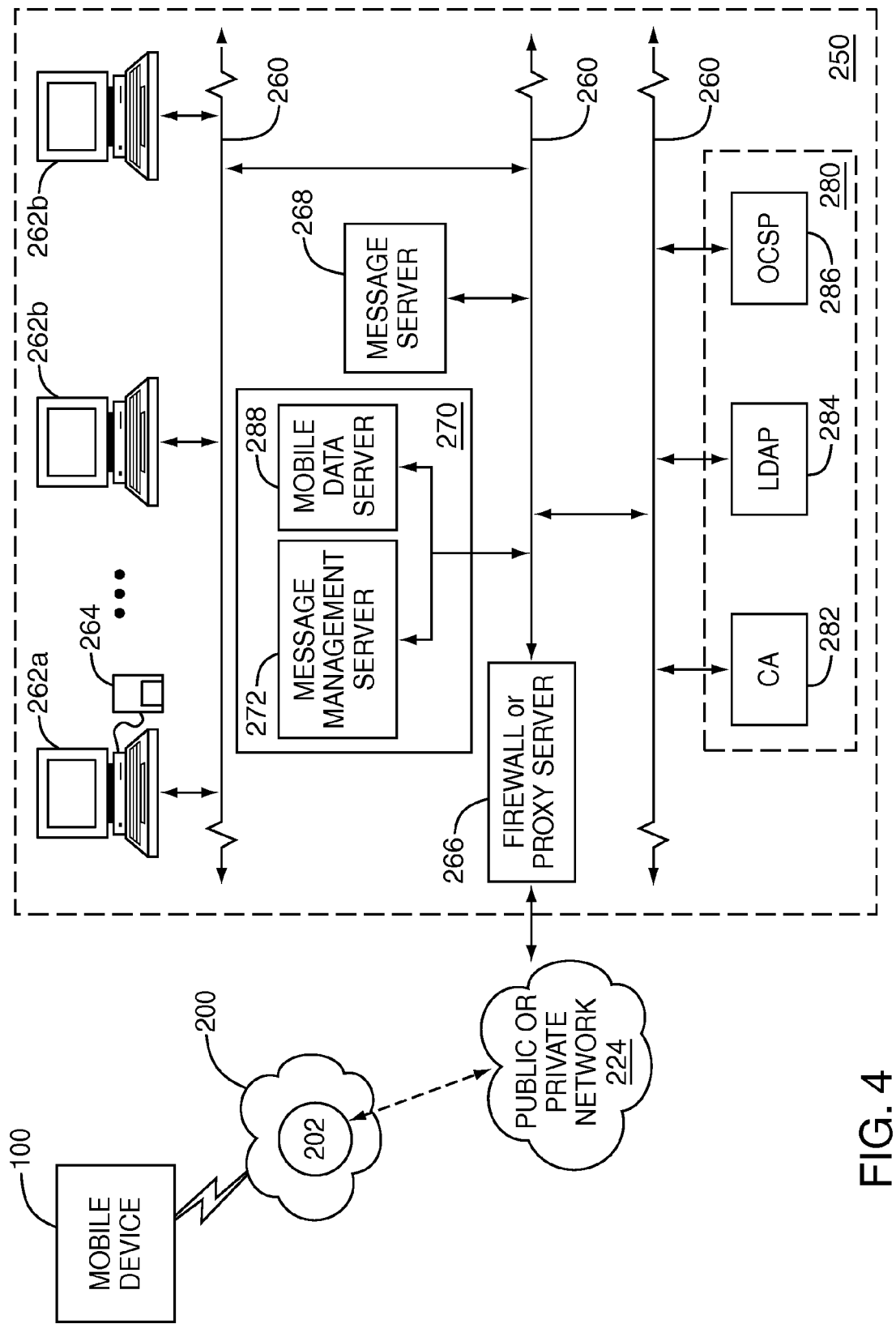
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262a, 262b will typically be also connected to other peripheral devices not explicitly shown in FIG. 4.

Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices needs to be supported.

Embodiments of the invention relate generally to certificates used in the processing of encoded messages, such as e-mail messages that are encrypted and/or signed. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and protects data integrity and privacy from the time an originator of a message sends a message until it is decoded and read by the message recipient. Other known standards and protocols may be employed to facilitate secure message communication, such as Pretty Good Privacy™ (PGP), OpenPGP, and others known in the art.

Secure messaging protocols such as S/MIME rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. Private key information is never made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature is a digest of the message (e.g. a hash of the message) encoded using the sender's private key, which can then be appended to the outgoing message. To verify the digital signature of the message when received, the recipient uses the same technique as the sender (e.g. using the same standard hash algorithm) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the sender's private key should be able to encode a signature that the recipient will decode correctly using the sender's public key. Therefore, by verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

Figure 5:
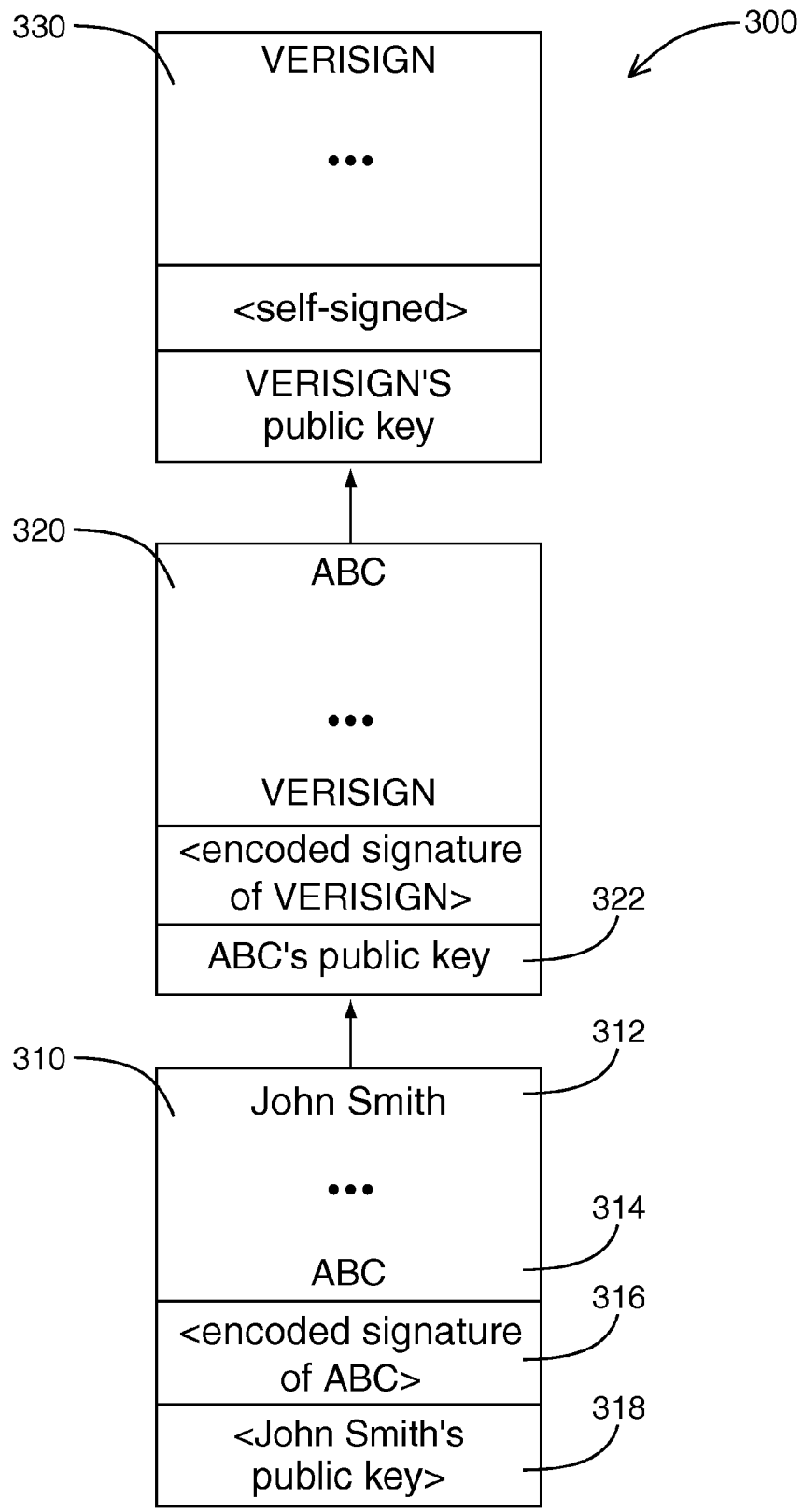
FIG. 5 is a block diagram showing an example of a certificate chain.

Consider FIG. 5, in which an example certificate chain 300 is shown. Certificate 310 issued to "John Smith" is an example of a certificate issued to an individual, which may be referred to as an end entity certificate. End entity certificate 310 typically identifies the certificate holder 312 (i.e. John Smith in this example) and the issuer of the certificate 314, and includes a digital signature of the issuer 316 and the certificate holder's public key 318. Certificate 310 will also typically include other information and attributes that identify the certificate holder (e.g. e-mail address, organization name, organizational unit name, location, etc.). When the individual composes a message to be sent to a recipient, it is customary to include that individual's certificate 310 with the message.

For a public key to be trusted, its issuing organization must be trusted. The relationship between a trusted CA and a user's public key can be represented by a series of related certificates, also referred to as a certificate chain. The certificate chain can be followed to determine the validity of a certificate.

For instance, in the example certificate chain 300 shown in FIG. 5, the recipient of a message purported to be sent by John Smith may wish to verify the trust status of certificate 310 attached to the received message. To verify the trust status of certificate 310 on a recipient's computing device (e.g. computer 262a of FIG. 4) for example, the certificate 320 of issuer ABC is obtained, and used to verify that certificate 310 was indeed signed by issuer ABC. Certificate 320 may already be stored in a certificate store on the computing device, or it may need to be retrieved from a certificate source (e.g. LDAP server 284 of FIG. 4 or some other public or private LDAP server). If certificate 320 is already stored in the recipient's computing device and the certificate has been designated as trusted by the recipient, then certificate 310 is considered to be trusted since it chains to a stored, trusted certificate.

However, in the example shown in FIG. 5, certificate 330 is also required to verify the trust status of certificate 310. Certificate 330 is self-signed, and is referred to as a "root certificate". Accordingly, certificate 320 may be referred to as an "intermediate certificate" in certificate chain 300; any given certificate chain to a root certificate, assuming a chain to the root certificate can be determined for a particular end entity certificate, may contain zero, one, or multiple intermediate certificates. If certificate 330 is a root certificate issued by a trusted source (from a large certificate authority such as Verisign or Entrust, for example), then certificate 310 may be considered to be trusted since it chains to a trusted certificate. The implication is that both the sender and the recipient of the message trust the source of the root certificate 330. If a certificate cannot be chained to a trusted certificate, the certificate may be considered to be "not trusted".

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

Standard e-mail security protocols typically facilitate secure message transmission between non-mobile computing devices (e.g. computers 262a, 262b of FIG. 4; remote desktop devices). Referring again to FIG. 4, in order that signed messages received from senders may be read from mobile device 100 and encrypted messages be sent to those senders, mobile device 100 is adapted to store certificates and associated public keys of other individuals. Certificates stored on a user's computer 262a will typically be downloaded from computer 262a to mobile device 100 through cradle 264, for example.

Certificates stored on computer 262a and downloaded to mobile device 100 are not limited to certificates associated with individuals but may also include certificates issued to CAs, for example. Certain certificates stored in computer 262a and/or mobile device 100 can also be explicitly designated as "trusted" by the user. Accordingly, when a certificate is received by a user on mobile device 100, it can be verified on mobile device 100 by matching the certificate with one stored on mobile device 100 and designated as trusted, or otherwise determined to be chained to a trusted certificate.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key is preferably exchanged between the computer 262a and mobile device 100 so that the user may share one identity and one method for accessing messages.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows certificate store, another secure certificate store on or outside LAN 250, and smart cards, for example.

Figure 6:
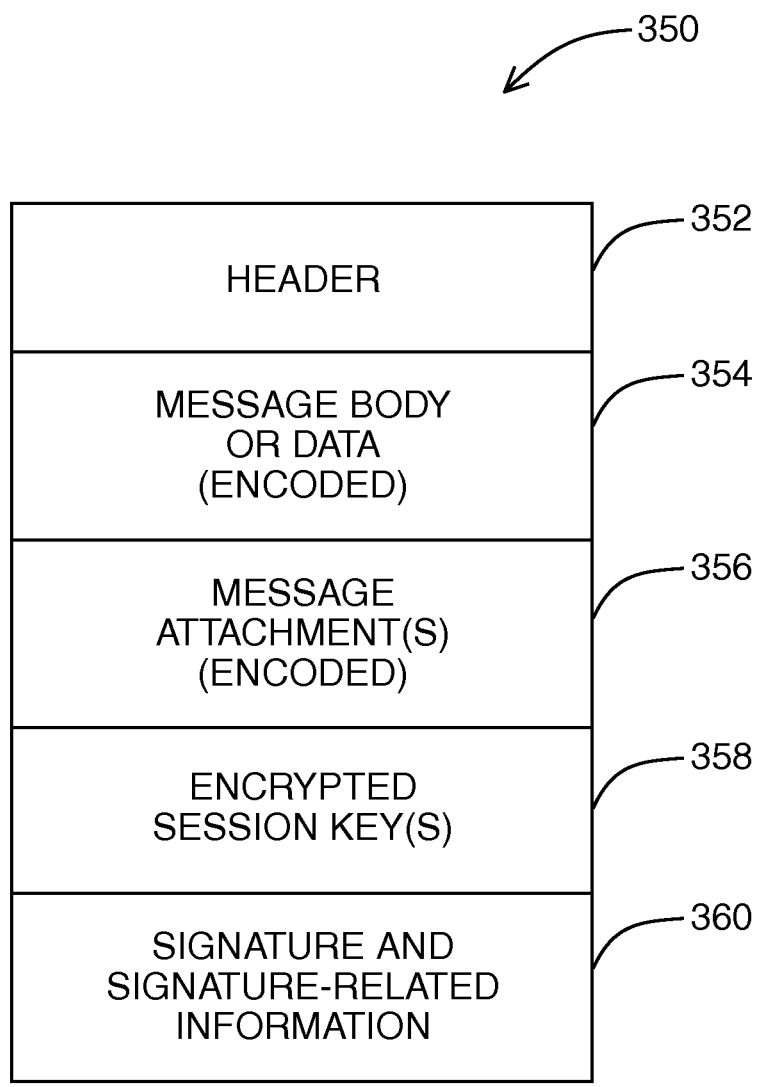
FIG. 6 is a block diagram illustrating components of an example of an encoded message.

Referring now to FIG. 6, a block diagram illustrating components of an example of an encoded message, as may be received by a message server (e.g. message server 268 of FIG. 4), is shown generally as 350. Encoded message 350 typically includes one or more of the following: a header portion 352, an encoded body portion 354, optionally one or more encoded attachments 356, one or more encrypted session keys 358, and signature and signature-related information 360. For example, header portion 352 typically includes addressing information such as "To", "From", and "CC" addresses, and may also include message length indicators, and sender encryption and signature scheme identifiers, for example. Actual message content normally includes a message body or data portion 354 and possibly one or more attachments 356, which may be encrypted by the sender using a session key. If a session key was used, it is typically encrypted for each intended recipient using the respective public key for each recipient, and included in the message at 358. If the message was signed, a signature and signature-related information 360 are also included. This may include the sender's certificate, for example.

The format for an encoded message as shown in FIG. 6 is provided by way of example only, and persons skilled in the art will understand that encoded messages may exist in other formats. For example, depending on the specific messaging scheme used, components of an encoded message may appear in a different order than shown in FIG. 6, and an encoded message may include fewer, additional, or different components, which may depend on whether the encoded message is encrypted, signed or both.

Embodiments of the invention are generally directed to a system and method that facilitates more efficient verification of digital signatures on certificates by storing certain information employed in signature verification operations for reuse. In building certificate chains (as discussed in the example of FIG. 5), the digital signatures on the certificates often need to be verified. Where multiple certificates are processed on a user's computing device, the same digital signature is often subject to verification more than once. This may be particularly prevalent where certificate chains containing cross-certificates are formed. Cross-certificates are discussed in further detail below with reference to FIG. 7B.

Figure 7A:
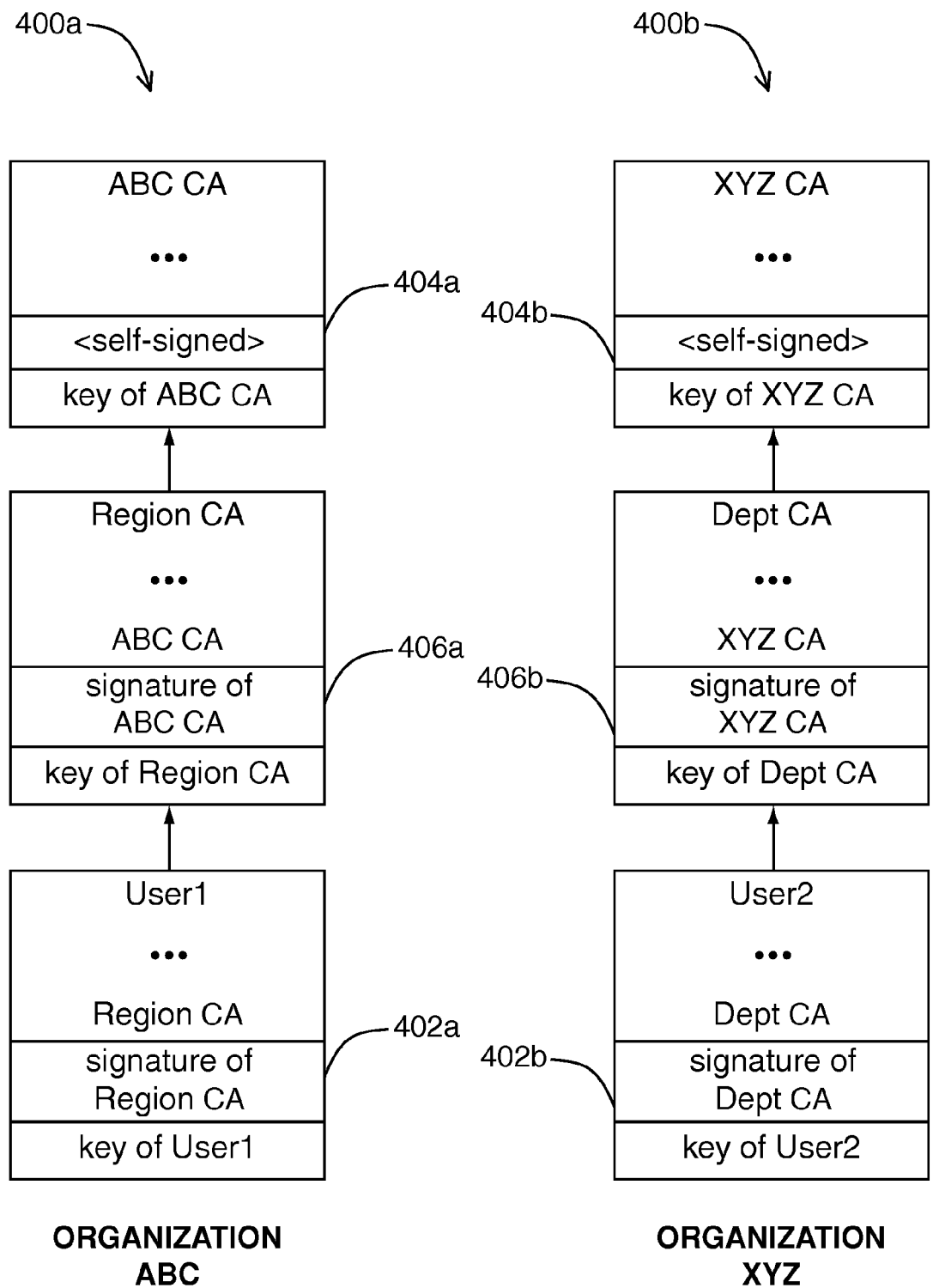
FIG. 7A is a block diagram showing two example certificate chains.

Referring first to FIG. 7A, a block diagram showing two example certificate chains is shown. The two example certificate chains are illustrated generally as 400a and 400b. It will be understood by persons skilled in the art that certificate chains 400a and 400b are provided as examples. In particular, a certificate chain may comprise a fewer or a greater number of certificates than depicted in the examples shown.

Many organizations establish their own CAs, which issue certificates specifically to individuals within their own organizations. End entity certificates issued to individuals within a particular organization need not be issued by a single CA associated with the organization. An end entity certificate is often issued by one of a number of subordinate or intermediate CAs within a CA hierarchy headed by a root CA for the organization. This root CA may provide a self-signed root certificate to be used as a "trust anchor"—a starting point for the validation of certificates issued within the organization.

Certificate chain 400a depicts an example chain of certificates formed to validate a certificate 402a issued to "user1", an individual within organization "ABC". Certificate 402a chains to a self-signed root certificate 404a, issued by a root CA of the organization and trusted by user1, via an intermediate certificate 406a issued by the root CA to an intermediate CA of the organization. The certificates issued within organization ABC may be searched and retrieved from an LDAP server maintained by the organization (e.g. LDAP server 284 of FIG. 4), for example.

Similarly, certificate chain 400b depicts an example chain of certificates formed to validate a certificate 402b issued to "user2", an individual within a different organization "XYZ". Certificate 402b chains to a self-signed root certificate 404b issued by a root CA of organization XYZ and trusted by user2, via an intermediate certificate 406b. The certificates issued within organization XYZ may be searched and retrieved from an LDAP server maintained by organization XYZ, for example.

Consider an example situation where user1 of organization ABC receives an encoded message from user2 of organization XYZ. Even if user2 has attached his certificate 402b to the message, user1 will be unable to verify the trust status of user2's certificate 402b with that certificate alone (assuming that user1 has not already stored user2's certificate 402b and marked it as trusted). If user1 does not trust certificates from organization XYZ, then user2's certificate 402b cannot be validated since it does not chain to a trusted certificate.

In order to facilitate secure communications between users of different organizations, it may be desirable to allow certificates to be used and trusted between the organizations. An authentication method known as cross-certification may be performed between two organizations, where a CA of one organization certifies a CA of the other organization.

The term cross-certification may be used to refer generally to two operations. The first operation, which is typically executed relatively infrequently, relates to the establishment of a trust relationship between two CAs (e.g. across organizations or within the same organization), through the signing of one CA's public key by another CA, in a certificate referred to as a cross-certificate. The second operation, which is typically executed relatively frequently, involves verifying a user's certificate through the formation of a certificate chain that includes at least one such cross-certificate.

Figure 7B:
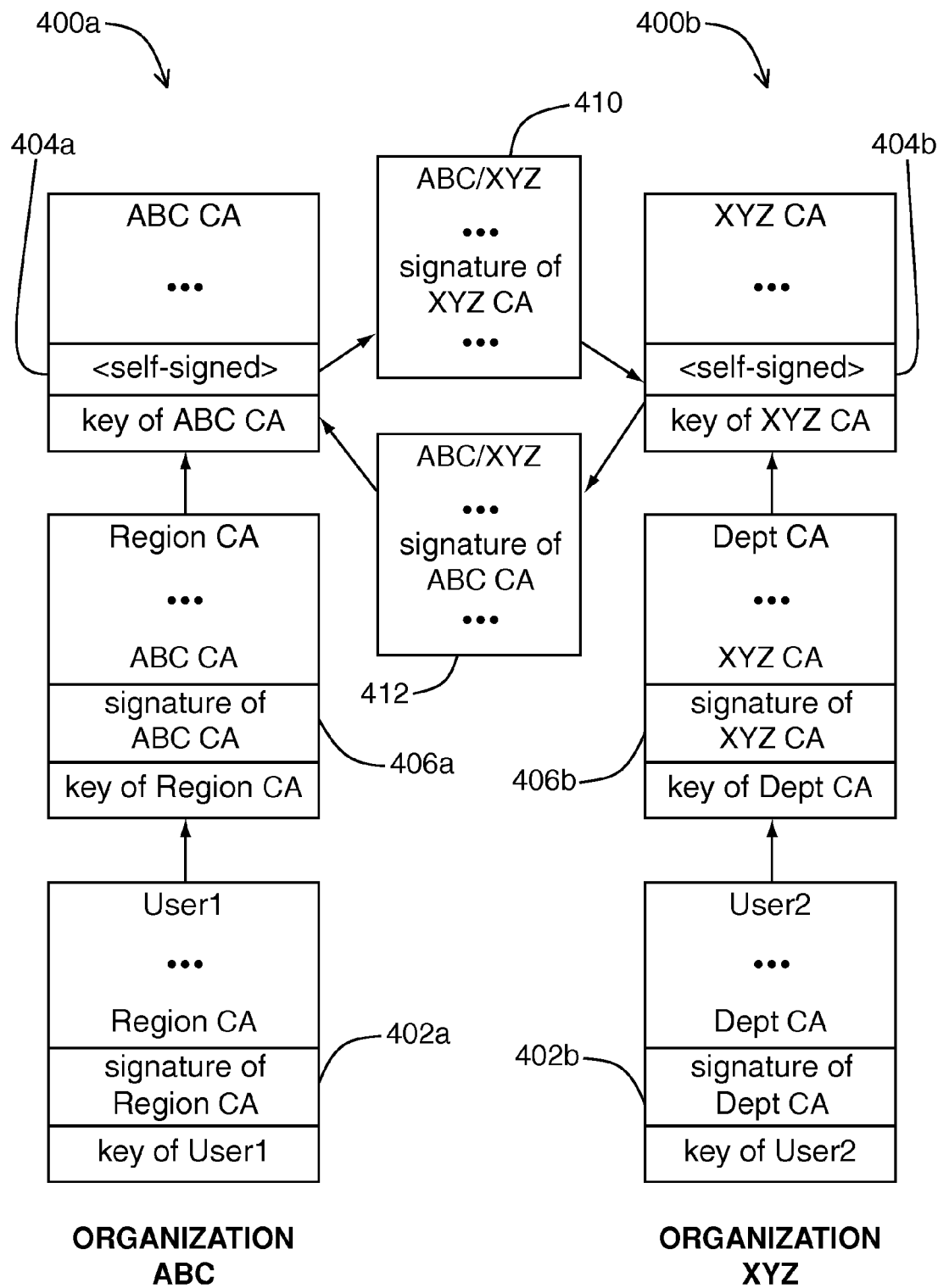
FIG. 7B is a block diagram showing cross-certificates linking the certificate chains of FIG. 7A.

Referring now to FIG. 7B, a block diagram showing examples of cross-certificates linking two example certificate chains is shown. A cross-certificate 410 issued to the root CA of organization ABC by the root CA of organization XYZ is shown in this example. Similarly, a cross-certificate 412 issued to the root CA of organization XYZ by the root CA of organization ABC is shown.

The example of FIG. 7B illustrates mutual cross-certification between two root CAs. However, other cross-certification methods are possible in variant implementations. For example, cross-certificates may be issued by a subordinate CA in one organization to the root CA of another organization. As a further example, a CA of a first organization may issue a cross-certificate to a CA of a second organization, even if a cross-certificate is not issued back to the first organization by the second organization.

Furthermore, certificate usage across organizations may be restricted, as dictated by an organization's IT policy, for example. For instance, the IT policy of one organization may dictate that certificates from other organizations will be trusted only for the purpose of processing encoded e-mail messages. Also, cross-certificates may be revoked by an issuing CA of one organization to terminate trust relationships with other organizations. This can facilitate more efficient control of secure e-mail communications between individuals across different organizations.

Cross-certificates facilitate secure communications between individuals of organizations that have established a trust relationship. Consider again the situation where user1 of organization ABC receives an encoded message from user2 of organization XYZ. User1 will be able to verify the trust status of user2's certificate 402b, by retrieving certificates in a chain from user2's certificate 402b, to root certificate 404a issued by a root CA of user1's organization and trusted by user1. Specifically, as shown in the example of FIG. 7B, the chain includes ABC's root certificate 404a, cross-certificate 412, XYZ's root certificate 404b, intermediate certificate 406b, and user2's certificate 402b.

For user1 to verify the trust status of user2's certificate 402b, user1 must obtain certificate 402b. This will customarily accompany the message from user2 to user1; however, in the event that certificate 402b is not provided and is not otherwise stored on user1's computing device, it must be retrieved, from an LDAP server maintained by organization XYZ, or other certificate server, for example. Furthermore, each of the remaining certificates in the chain must also be retrieved to verify the trust status of certificate 402b. The other certificates in the chain, which in this example include a root certificate and a cross-certificate, would need to be retrieved from ABC's LDAP server, XYZ's LDAP server, or some other LDAP server accessible to user1.

As discussed with reference to FIG. 5, and FIGS. 7A and 7B, the digital signatures of issuing CAs on certificates often need to be verified when building certificate chains. Other tasks may also be performed when validating certificates, such as checking the validity of a certificate's date, or checking other validation criteria that might be established by an organization in accordance with an IT policy, for example.

Verification of a digital signature on a certificate is a process that requires the public key of the issuing CA. When a CA digitally signs a certificate, certificate information including the name and public key of the certificate holder for example, or a hash of that information obtained through application of a hashing algorithm, is typically encoded using the CA's private key. The algorithm used by the issuing CA to sign a certificate is typically identified in the certificate. Subsequently, in a manner similar to that employed in verifying the digital signature of a message signed by a user, the CA's digital signature on a certificate can be verified by decoding the encoded information or hash using the CA's public key, and comparing the result to the expected certificate information or hash thereof respectively. A successful match indicates that the CA has verified that the certificate holder's public key may be validly bound to the certificate holder, and suggests that the certificate holders public key can be trusted if the CA is trusted.

Verifying certificate signatures can be a process that is both time-consuming and costly (e.g. in terms of computing resource usage), particularly where the verifications are performed on small devices, such as mobile devices for example. Embodiments of the invention are generally directed to a system and method that facilitates more efficient verification of digital signatures on certificates by storing certain information employed in signature verification operations for reuse.

In at least one embodiment, one or more public keys of a CA that has issued a particular certificate are associated with that certificate, and cached or stored. As indicated above, when attempting to verify a digital signature on a certificate signed by a CA, the CA's public key is required. However, there may exist multiple certificates (each with a public key attached) that appear to belong to the same CA. This situation might arise if several certificates have the same or similar subject data (i.e. the certificate data which identifies the certificate holder) or if the CA has been issued multiple public keys (some of which may no longer be valid), for example. Accordingly, it can be beneficial to track which particular public key has been used to successfully verify a particular certificate.

Figure 8A:
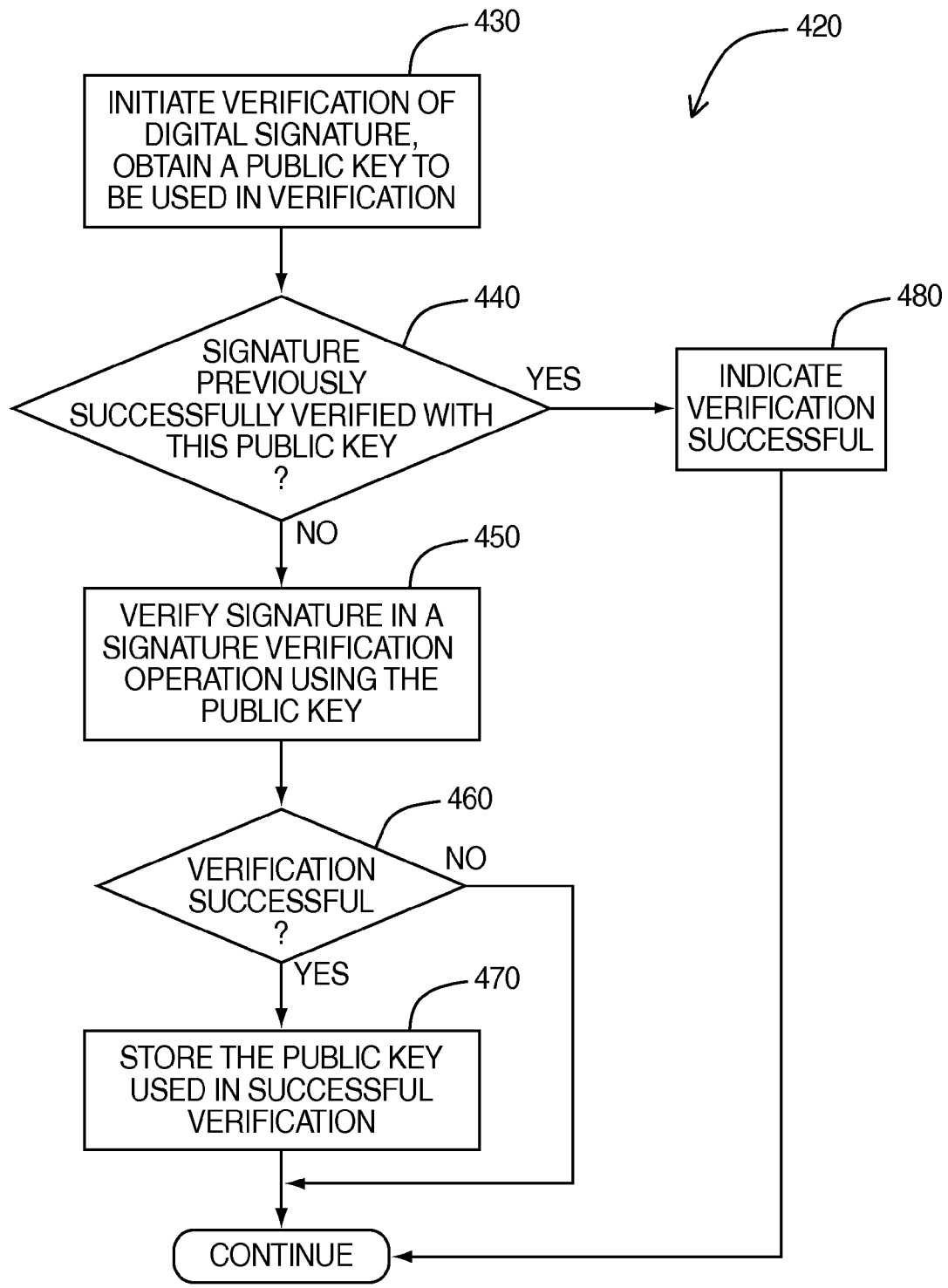
FIG. 8A is a flowchart illustrating steps in a method of verifying a digital signature on a certificate in an embodiment of the invention.

Referring to FIG. 8, a flowchart illustrating steps in a method of verifying digital signatures on certificates in an embodiment of the invention is shown generally as 420.

In one embodiment of the invention, at least some of the steps of the method are performed by a certificate validation application that executes and resides on a mobile device. In variant embodiments, the certificate validation application may be residing and executing on a computing device other than a mobile device. Furthermore, the certificate validation application need not be a stand-alone application, and the functionality of the certificate validation application may be implemented in one or more applications executing and residing on the mobile or other computing device.

Generally, in method 420, when a given public key is used in successfully verifying the digital signature on a certificate, a copy of that public key is cached, or otherwise stored in a memory store. For example, the public key may be stored with the certificate data associated with the certificate, or in a separate memory store (e.g. a lookup table) adapted to store public keys employed in successful signature verifications. When a subsequent attempt to verify the digital signature on the same certificate is made, rather than immediately performing an expensive signature verification operation requiring at least the decoding of some data using a public key, the public key that would have been used to verify the digital signature again is instead initially compared to the stored public key. If these public keys match, then the verification will be deemed successful, since the public key to be used matches a key that has been previously used successfully in a signature verification operation. It is considered unnecessary to perform an actual signature verification operation again for the same digital signature. Accordingly, at least some subsequent signature verification operations may be replaced by more efficient (e.g. byte array) comparison operations. The steps of method 420 are described in further detail below.

At step 430, a verification of a digital signature on a certificate is initiated (e.g. by the certificate validation application). Verifications of digital signatures on certificates may be performed, for instance, when building certificate chains in order to validate specific certificates received by a user (e.g. to verify the trust status of a certificate attached to a received message as discussed with reference to FIG. 5). In this embodiment, the digital signatures on the certificates being verified are those of the certification authorities that issued the respective certificates. As noted earlier, in a signature verification operation, a public key of the certification authority that issued the certificate is required. Certificate(s) and public key(s) of the certification authority may need to be retrieved at this step (e.g. from an LDAP server) if they are not already stored in a certificate store on the mobile or other computing device.

For a given public key, at step 440, prior to performing the signature verification operation using this public key, a determination is made as to whether the digital signature on the subject certificate has previously been successfully verified using this public key. As indicated above, this may be done by comparing a stored public key for the certificate issuer previously used to successfully verify the digital signature on the subject certificate (if one exists, as stored at step 470 in the cache or other memory store) with the public key that is about to be used to verify the digital signature, and then determining if there is a match. Since only public keys employed in successful verification attempts are stored in the cache or other memory store in this embodiment, if a match were determined, this would suggest that the digital signature on the subject certificate has previously been successfully verified.

If the digital signature on the subject certificate has not been previously successfully verified using the given public key, then at step 450, the digital signature is verified using this public key in known manner. If the signature is successfully verified as determined at step 460 using this public key, then the public key used in this successful verification is stored in the cache or other memory store for future use at step 470, in accordance with this embodiment. For example, the public key stored at step 470 may be stored with the data associated with the subject certificate, or in a central memory store for public keys (e.g. in a lookup table) indexed by certificate (e.g. by storing the issuer name and serial number of the certificate with the public key).

On the other hand, if the digital signature on the subject certificate had previously been successfully verified using the given public key as determined at step 440, then at step 480, an indication that the verification is successful is provided. This is done in lieu of performing an actual signature verification operation requiring at least the decoding of some data using a public key, thereby making the signature verification process more efficient. This may help conserve battery power and enhance the user experience, for example, particularly for small devices such as mobile devices.

The steps of method 420 may be repeated for additional public keys.

Figure 8B:
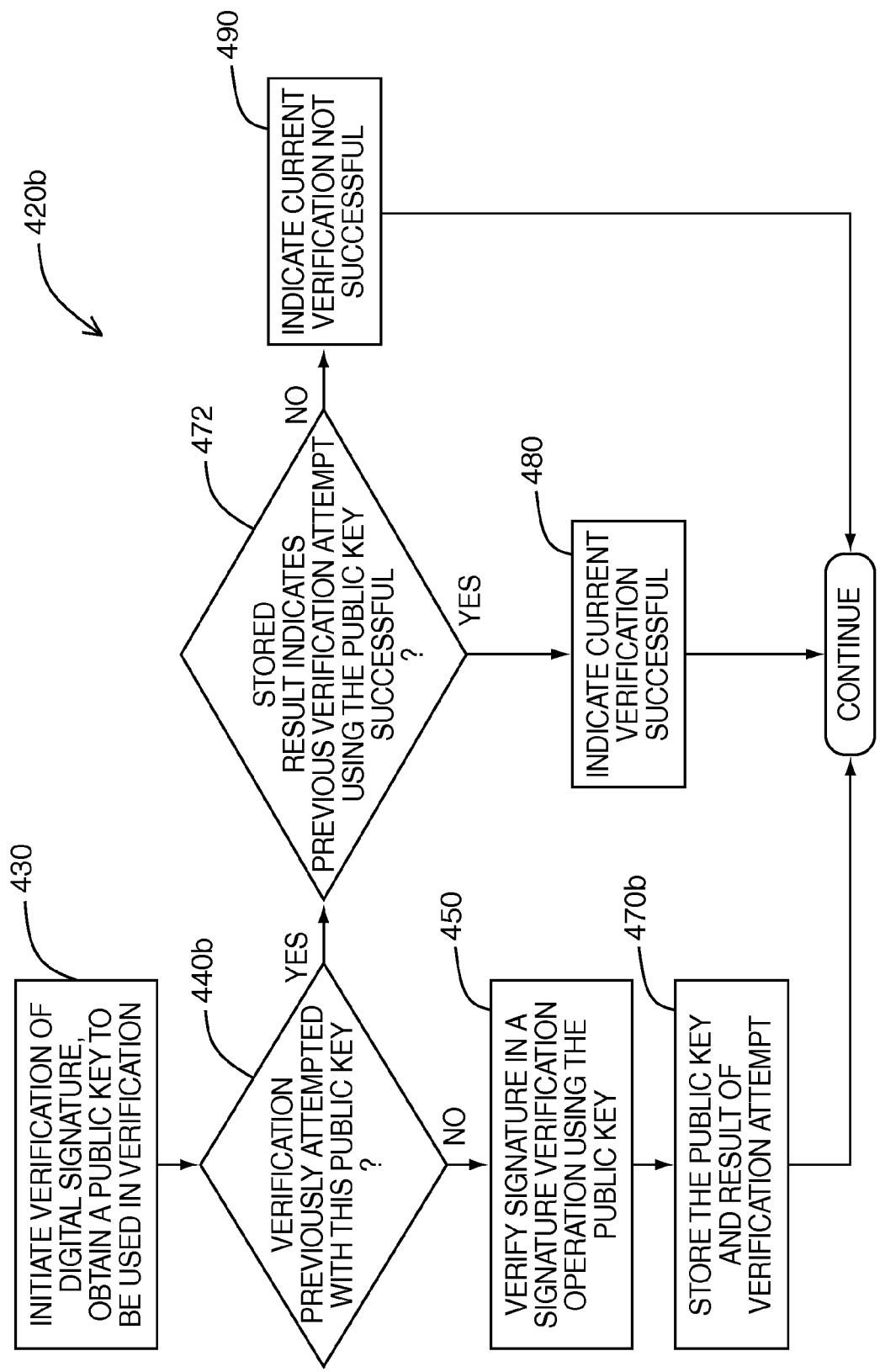
FIG. 8B is a flowchart illustrating steps in a method of verifying a digital signature on a certificate in another embodiment of the invention.

Referring now to FIG. 8B, a flowchart illustrating steps in a method of verifying digital signatures on certificates in another embodiment of the invention is shown generally as 420*b*.

Method 420*b* is similar to method 420, except that in contrast to method 420 where only the public keys employed in successful signature verifications are stored in the cache or other memory store, in method 420*b*, the public keys used in any signature verification attempt (whether successful or unsuccessful) are stored in the cache or other memory store along with the result of the verification attempt.

Generally, in method 420*b*, when a given public key is used in verifying the digital signature on a certificate, a copy of that public key is cached or otherwise stored in a memory store, along with the result of the operation. For example, the public key and associated result may be stored with the certificate data associated with the certificate, or in a separate memory store (e.g. a lookup table). When a subsequent attempt to verify the digital signature on the same certificate is made using the given public key, rather than performing an expensive signature verification operation requiring at least the decoding of some data using that public key, the public key that would have been used to verify the digital signature again is instead initially compared to the stored public key(s). If the given public key matches a stored public key, then the current verification attempt will be deemed successful or not successful, depending on the stored result associated with that stored public key. If the stored result indicates that the previous verification attempt with that stored public key was successful, then the current verification attempt will be deemed to succeed. If the stored result indicates that the previous verification attempt with that stored public key was not successful, then the current verification attempt will be deemed to fail. Accordingly, subsequent signature verification operations that would otherwise require decoding of some data using public keys may be replaced by more efficient (e.g. byte array) comparison operations.

At step 430, a verification of a digital signature on a certificate is initiated (e.g. by the certificate validation application), as described with reference to method 420.

For a given public key, at step 440*b*, prior to performing the signature verification operation using this public key, a determination is made as to whether the digital signature on the subject certificate has previously been verified using this public key. As indicated above, this may be done by comparing a public key for the certificate issuer previously used to verify the digital signature on the subject certificate (if one exists, as stored at step 470 in the cache or other memory store) with the public key that is about to be used to verify the digital signature, and determining if there is a match. If a match were determined, this would suggest that an attempt to verify the digital signature on the subject certificate was previously made.

If an attempt to verify the digital signature on the subject certificate was not previously made, then a signature verification operation is performed in known manner at step 450, as similarly described with reference to method 420. Both the public key used in the verification and the result of the verification attempt (i.e. an indicator of whether the digital signature was successfully or unsuccessfully verified) are stored in the cache or other memory store for future use at step 470b, in accordance with this embodiment. For example, the public key and result stored at step 470b may be stored with the data associated with the subject certificate, or in a central memory store for public keys (e.g. in a lookup table) indexed by certificate (e.g. by storing the serial number of the certificate with the public key).

If the digital signature on the subject certificate has previously been verified with the given public key as determined at step 440b, then at step 472, the result of the previous verification attempt with this key is retrieved from the cache or other memory store and a determination is made as to whether or not the stored result indicates that the previous verification attempt with this key was successful. If so, then at step 480, an indication that the current verification is to succeed is provided; if not, then at step 490, an indication that the current verification is not to succeed is provided.

The steps of method 420b may be repeated for additional public keys.

In lieu of performing a signature verification operation requiring at least the decoding of some data using a given public key, the results of previous verification attempts are used to determine if a verification using this public key should fail, thereby making the signature verification process more efficient. In particular, if a user requests verification of the digital signature of a certificate multiple times using the same invalid public key, then an actual expensive signature verification operation requiring at least the decoding of some data using the public key need be performed only once, and the subsequent attempts will fail immediately after performing a relatively efficient (e.g. byte array) comparison operation. This may further help conserve battery power and enhance the user experience, for example, particularly for small devices such as mobile devices.

It will be understood by persons skilled in the art that other information in addition to the public keys and verification attempt results described above may also be stored in the cache or other memory store, if desired, in variant embodiments.

In a variant embodiment of the invention, public keys and other information (e.g. verification attempt results) stored in the cache or other memory store may only be permitted for use in public key comparisons for a limited duration, after which they may be considered stale and subject to deletion from the cache or other memory store. This may be done for security purposes so that an actual signature verification operation requiring at least the decoding of some data using a public key must be re-performed from time-to-time. This duration may be set in accordance with IT Policy, for example. Similarly, in another variant embodiment of the invention, some or all of the public keys and other information stored in the cache or other memory store may be marked as stale or deleted as may be directed manually by a user or administrator, for example, so that the signature verification operation must be re-performed. For more enhanced security, validation operations may also be performed to ensure that public keys (e.g. public keys which previously successfully verified a certificate signature) have not become invalid after storage, for example.

The steps of a method of verifying digital signatures on certificates in embodiments of the invention may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A non-transitory computer readable medium storing instructions executable by a processor of a computing device, which, when executed by the processor, cause the processor to:
   store, in a memory store, a stored public key in response to a first successful verification of a digital signature on a certificate on the computing device, the first successful verification resulting from performing a signature verification operation on the digital signature using the stored public key;
   receive a public key associated with an issuer of the certificate, and a request to verify the digital signature of the certificate using the received public key;
   compare the received public key to the stored public key, in lieu of performing the signature verification operation on the digital signature using the received public key; and
   indicate a second successful verification of the digital signature in response to determining that the received public key matches the stored public key.

2. The non-transitory computer readable medium of claim 1, wherein the computing device comprises a mobile device.

3. The non-transitory computer readable medium of claim 1, wherein the instructions, when executed by the processor, further cause the processor to identify the stored public key as stale if the stored public key has been stored in the memory store for longer than a pre-determined duration.

4. The computer readable medium of claim 3, wherein the instructions, when executed by the processor, further cause the processor to compare the received public key with the stored public key residing in the memory store.

5. The non-transitory computer readable medium of claim 4, wherein the instructions, when executed by the processor, further cause the processor to indicate successful verification of the digital signature if the stored public key is not identified as stale.

6. The non-transitory computer readable medium of claim 3, wherein the instructions, when executed by the processor, further cause the processor to delete the stored public key from the memory store if the stored public key is identified as stale.

7. The non-transitory computer readable medium of claim 1, wherein the instructions, when executed by the processor, further cause the processor to mark the stored public key as stale in response to a user request.

8. The non-transitory computer readable medium of claim 7, wherein the instructions, when executed by the processor, further cause the processor to compare the received public key with the stored public key residing in the memory store.

9. The non-transitory computer readable medium of claim 8, wherein the instructions, when executed by the processor, further cause the processor to indicate successful verification of the digital signature if the stored public key is not marked as stale.

10. The non-transitory computer readable medium of claim 7, wherein the instructions, when executed by the processor, further cause the processor to delete the stored public key from the memory store if the stored public key is marked as stale.

11. A non-transitory computer readable medium storing instructions executable by a processor of a computing device, which, when executed by the processor, cause the processor to:
   store, in a memory store, a stored public key and a prior verification result in response to a first successful verification of a digital signature on a certificate on the computing device, the first successful verification resulting from performing a signature verification operation on the digital signature using the stored public key;
   receive a public key associated with an issuer of the certificate, and a request to verify the digital signature of the certificate using the received public key;
   compare the received public key to the stored public key, in lieu of performing the signature verification operation on the digital signature using the received public key;
   indicate a second successful verification of the digital signature in response to determining that the received public key matches the stored public key, and that the prior verification result associated with the stored public key was successful; and
   indicate unsuccessful verification of the digital signature in response to determining that the received public key matches the stored public key, and that the prior verification result was unsuccessful.

12. The non-transitory computer readable medium of claim 11, wherein the computing device comprises a mobile device.

13. The non-transitory computer readable medium of claim 11, wherein the instructions, when executed by the processor, further cause the processor to identify the stored public key as stale if the stored public key has been stored in the memory store for longer than a pre-determined duration.

14. The non-transitory computer readable medium of claim 13, wherein the instructions, when executed by the processor, further cause the processor to compare the received public key with the stored public key residing in the memory store.

15. The non-transitory computer readable medium of claim 14, wherein the instructions, when executed by the processor, further cause the processor to indicate successful or unsuccessful verification of the digital signature depending on the prior verification result if the stored public key is not identified as stale.

16. The non-transitory computer readable medium of claim 13, wherein the instructions, when executed by the processor, further cause the processor to delete the stored public key from the memory store if the stored public key is identified as stale.

17. The non-transitory computer readable medium of claim 11, wherein the instructions, when executed by the processor, further cause the processor to mark the stored public key as stale in response to a user request.

18. The non-transitory computer readable medium of claim 17, wherein the instructions, when executed by the processor, further cause the processor compare the received public key with the stored public key residing in the memory store.

19. The non-transitory computer readable medium of claim 18, wherein the instructions, when executed by the processor, further cause the processor to indicate successful or unsuccessful verification of the digital signature depending on the prior verification result if the stored public key is not marked as stale.

20. The non-transitory computer readable medium of claim 17, wherein the instructions, when executed by the processor, further cause the processor to delete the stored public key from the memory store if the stored public key is marked as stale.

* * * * *